April 14, 1970 — W. B. McDOWELL — 3,506,229

METER MOUNTING APPARATUS

Filed Nov. 14, 1967 — 2 Sheets-Sheet 1

INVENTOR
WILLIAM B. McDOWELL

BY Beaman & Beaman

ATTORNEYS

INVENTOR
WILLIAM B. McDOWELL

BY Beaman & Beaman

ATTORNEYS

United States Patent Office 3,506,229
Patented Apr. 14, 1970

3,506,229
METER MOUNTING APPARATUS
William B. McDowell, Fenton, Mich., assignor to Michigan Tube Benders, Inc., Ypsilanti, Mich., a corporation of Michigan
Filed Nov. 14, 1967, Ser. No. 682,876
Int. Cl. G01f 15/18
U.S. Cl. 248—68        6 Claims

ABSTRACT OF THE DISCLOSURE

Meter mounting apparatus for use with public utility meter installations adjacent a building wherein the apparatus includes a channel member having conduits directly affixed to the side portions of the channel member, and the conduits include an upper region transversely disposed to the channel member, and the conduits lower regions are offset with respect to the conduit portion affixed to the channel member. Meter housing support means are mounted upon the channel member for permitting attachment of a meter housing thereto and a foundation bracket may be optionally used with the channel bracket.

BACKGROUND OF THE INVENTION

The invention pertains to the field of brackets for mounting utility meters wherein the conduits supplying the meter are directly and permanently affixed to the bracket.

Brackets and installations permitting public utility meters, such as gas meters, to be installed adjacent the exterior wall of buildings are rather recent developments. My U.S. Patent Re. 26,191 is directed to this type of device.

Prior to the development of meter mounting brackets of the type disclosed in the aforementioned patent, and the instant application, it was the practice to mount exteriorly located meters directly upon the supply conduits. This type of meter support is objectionable in that undue stresses are placed upon the conduits and no uniformity in the installation and appearance is produced. Those supports which were heretofore available for public utility meters often did not include the conduits for supplying the meter, and thus the utility company found it necessary to furnish a wide variety of parts to permit installation of different types of meters with various housings and supporting means.

SUMMARY OF THE INVENTION

The invention is directed to meter mounting apparatus which includes a vertically disposed channel member which consists of a base portion and parallel side portions extending therefrom. A conduit is affixed to each of the side portions whereby the conduits and the channel member constitute a complete integral unit. The conduits are preferably furnished with fittings which will permit the meter installation crew to quickly attach a meter to the mounting apparatus, once the mounting apparatus is secured in place.

The conduits used with the apparatus of the invention include a central region which is affixed to the channel member side portions. The upper regions of the conduits may be bent with either 180° or 90° bends disposed transversely to the associated conduit central region. The lower regions of the conduits are offset with respect to the central region in order to provide clearance between the associated conduits and the wall of the structure to which the apparatus is mounted.

Preferably, the channel member and the conduits affixed thereto are formed of aluminum. The use of aluminum in this application is of advantage in that noncorrosive characteristics are provided, the weight of the apparatus is minimized, and the conduits and channel member may be readily formed and machined. By using a high strength aluminum alloy the aluminum conduits are capable of easily supporting the weight imposed thereon.

In order to permit a meter housing to be attached to the bracket, meter housing mounting means are defined upon the channel member. Thus, a meter housing may be attached to the channel member rather than the meter itself, and a uniform type of installation for various configurations of meters is provided.

Preferably, a foundation bracket of the type illustrated in the previously mentioned patent is also utilized with the channel member of the invention. The use of the foundation bracket permits the majority of the weight of the apparatus, and the meter, to be imposed upon the building foundation, which is an important feature due to forces imposed upon the meter supplying conduits due to settling or frost conditions.

The unitary construction of the conduits and channel member permits a public utility company to be provided with meter mounting apparatus of a uniform nature which permits meters to be readily affixed thereto in an attractive and firm manner. As the normal practice of meter installations calls for the installation of a large number of identical meter installations the uniformity of meter mounting apparatus provided by the invention substantially reduces the time involved in mounting the apparatus, and installing the meter thereto.

BRIEF DESCRIPTION OF THE DRAWINGS

The advantages and improvements attendant with the inventive concept will be appreciated from the following description and accompanying drawings wherein.

DESCRIPTION OF THE PREFERRED EMBODIMENTS

Figure 1:
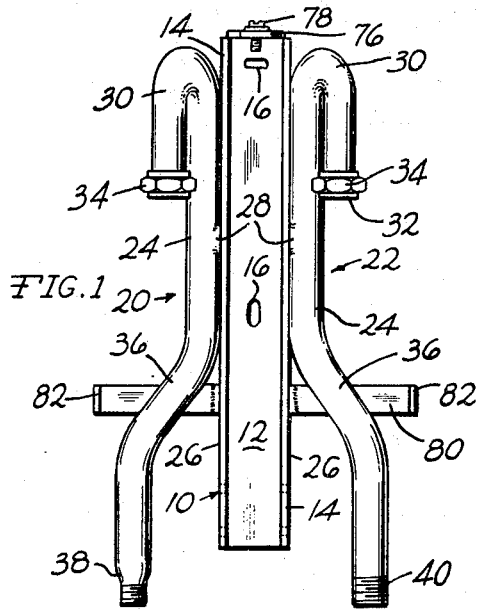
FIG. 1 is a front elevational view of meter housing apparatus in accord with the invention.
Figure 2:
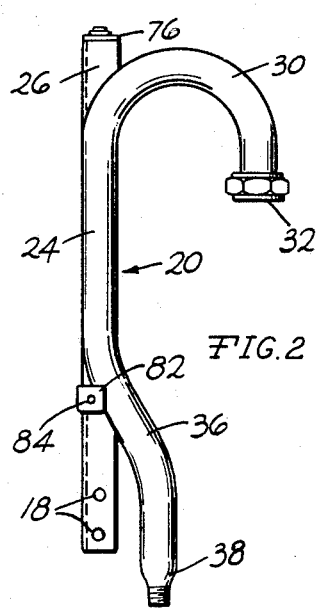
FIG. 2 is a side elevational view of the apparatus as taken from the left of FIG. 1.
Figures 4, 5:
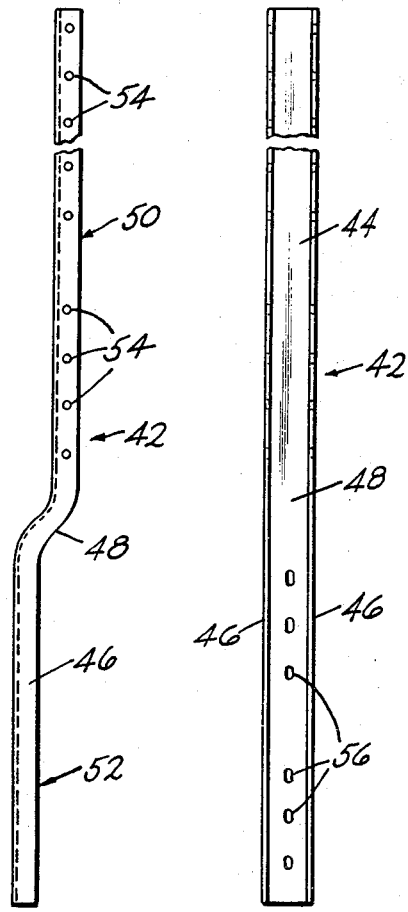
FIG. 4 is a front elevational view of the foundation bracket which may be used with the apparatus of the invention.
FIG. 5 is a side elevational view of the foundation bracket of FIG. 4 as taken from the left side thereof.

Meter mounting apparatus in accord with the invention includes a channel-shaped member 10 of an elongated configuration. The member 10 includes a planar base portion 12 and a pair of side portions 14 which depend from the longitudinal edges of the base portion in a common direction from the base portion. As viewed in FIG. 1 the side portions 12 extend toward the viewer, and it will be observed that the side portions are parallel to each other wherein a U-shaped cross section is produced. Holes 16 are defined in the base portion of the channel member wherein fasteners may extend through these holes to directly mount the channel member to a supporting surface, such as the wall of a building. However, it is preferred that the channel member be mounted upon a foundation bracket as illustrated in FIGS. 4 and 5, and for this purpose a pair of holes 18 are formed in each of the side portions wherein the channel member may be attached to the foundation bracket in a manner as will be later described.

An inlet or supply conduit 20, and an outlet conduit 22, are fixed to the channel member. Each of the conduits 20 and 22 include a central region 24 of a linear configuration which is disposed adjacent the outer surface 26 of a channel member side portion, and affixed thereto by means of welds 28. In the embodiment of FIGS. 1 through 6, the upper region 30 of the conduits is provided with a 180° bend which is transversely disposed to the longitudinal direction of the associated channel member central region and terminates at a downwardly disposed end 32 formed with a swivel nut connection 34. Preferably, the ends 32 of the conduits are upset or otherwise provided with a seating surface and shoulder wherein the nut connections 34 are rotatably mounted upon the associated conduit and a seating connection with the meter is accomplished between the meter and the conduits upon tightening of the nuts 34.

The lower region of the conduits is offset at 36 with respect to the associated central region 22, and the lower ends are formed in a linear manner as will be apparent from the drawings. The direction of the offsets 36 separates the lower regions of the conduits 20 and 22 a greater distance than the degree of separation between the upper ends 32 of the conduits, and also locates the conduit lower regions from the plane of the channel member base portion in the direction of the extension of the side portions 14, as will be appreciated from FIG. 2.

In the described embodiments, gas meters are used with the meter mounting apparatus, and as it is common to use ¾ inch pipe with the majority of high pressure gas lines used to supply domestic dwellings, the lower end of the supply conduit 20 is swaged at 38 and threaded to accommodate a ¾ inch fitting, without requiring a reducer or other plumbing fitting. The lowermost end of the outlet conduit 22 is threaded at 40, and the initial dimension of the conduit 22 is such that the threads 40 will accommodate the one inch pipe usually used with domestic gas meter installations on the metered, low-pressure side of the installation.

It is desirable to form both the channel member 10 and the conduits 20 and 22 of high strength aluminum alloy. Thus corrosive problems are minimized, yet the use of aluminum permits well formed bends, without crimping of the conduit, and permits forming operations such as the upsetting at ends 32 and the swaging at 38.

As it is desirable to mount the channel member 10 upon the building foundation a foundation bracket 42, as illustrated in FIGS. 4 and 5, is preferably employed. The foundation bracket illustrated is identical to that shown and described in my U.S. Patent Re. 26,191, and is formed of a channel member having a base portion 44 and side portions 46. The bracket 42 is offset at 48, FIG. 5, to form an upper region 50 and a lower region 52. The dimension of the offset 48 is such that the lower region 52 of the foundation bracket may be affixed to the foundation of the building, and the upper portion of the foundation bracket will be in substantial alignment with the overhang of the siding of the building. The upper region of the bracket side portions 46 is provided with a plurality of holes 54 having a vertical spacing equal to the spacing of the channel member holes 18. The lower region of the foundation bracket is provided with a plurality of holes 54 in the base portion wherein fasteners, such as expansion bolts, Ramset fasteners, or other masonry connections may be used to attach the foundation bracket to the building foundation.

Figures 6, 7:
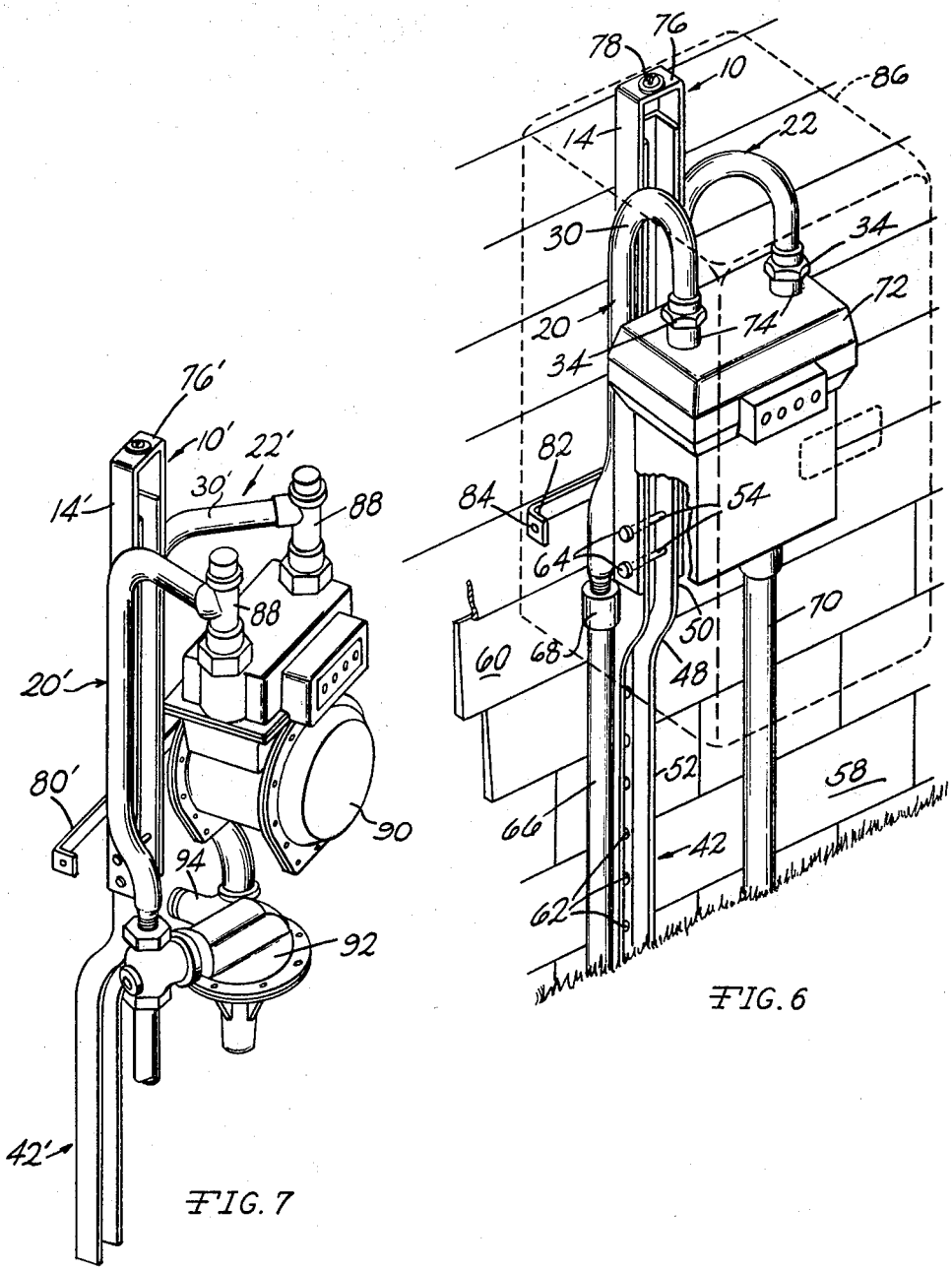
FIG. 6 is a perspective view of the apparatus of FIGS. 1 through 5 as assembled and installed upon the side of a building, the meter being illustrated, and partly sectioned, a meter housing being illustrated in dotted lines.
FIG. 7 is a perspective view of an embodiment of the inventive concept illustrating conduits having upper regions including 90° bends associated with meter bypass fittings, and a meter.

A typical installation of the aforedescribed apparatus is shown in FIG. 6 wherein the foundation of a building is represented at 58, and the siding thereof is shown at 60. The foundation bracket 42 is affixed to the foundation 58 by means of the masonry fasteners 62. Thus, the foundation bracket is installed in a vertical direction, and the upper region 50 is disposed alongside the building siding. The width of the foundation bracket 42 is such as to be received between the side portions 14 of the channel member 10. This connection is a sliding fit and upon the channel member being vertically adjusted to the foundation bracket as desired, bolts 64 are inserted through holes 18 and holes 54 upon alignment of these holes to interconnect the channel member and the foundation bracket in the desired vertical relationship. The channel member 10 may be attached to the foundation bracket either before or after the bracket is attached to the building foundation. In that a plurality of holes 54 are defined in the foundation bracket it will be appreciated that a number of vertical adjustments of the channel member 10 with respect to the foundation bracket are available.

After installation of the meter mounting apparatus to the building the underground supply conduit 66 may be attached to the lower end of the conduit 20 by means of a coupling or union connection 68. In a like manner, the outlet pipe 70 may be attached to the lower end of the outlet conduit 22 where it would pass into the ground and into the building below the ground level.

A meter is represented at 72 and includes fittings 74 formed at the top of the meter which are spaced to cooperate with the swivel nut connections 34. Of course, the spacing between the nuts 34 of the described meter installation will be initially predetermined to align with the spacing of the fittings 74 of the type of meter with which the apparatus will be employed. Thus, the meter may be very quickly and firmly affixed to the conduits 20 and 22 by means of the nuts 34.

It is usually desired that a meter housing be mounted upon the meter mounting apparatus to shield the meter from view, and protect the meter from the weather. For this purpose an upper meter mounting flange 76 is defined upon the upper end of the channel member 10. The flange 76 is formed by bending a portion of the base portion 12 in the same direction with respect to the plane of the base portion as the side portions 14. Thereupon, a threaded hole is formed in the flange to receive a screw 78.

Figure 3:
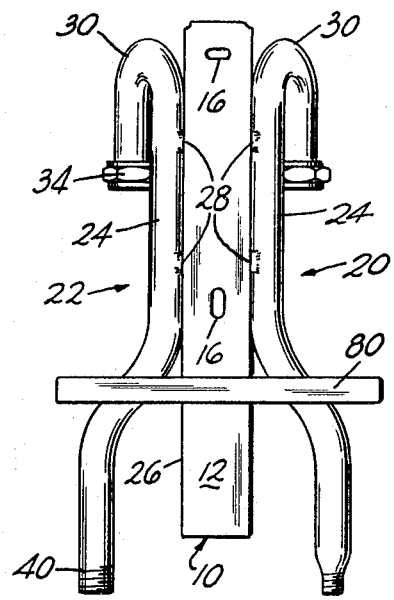
FIG. 3 is a rear elevational view of the apparatus of FIG. 1.

The lower portions of the meter housing are supported upon a bracket 80 which is attached to the backside of channel member 10, FIG. 3, and includes end portions extending outwardly equal distances with respect to each of the channel member side portions 12. The outermost ends 82 of the bracket 80 are bent in an outwardly direction, FIG. 6, and are each provided with a hole 84 which may be threaded, if desired, for association with a fastener. Thus, the meter mounting housing 86, shown in dotted lines in FIG. 6, may be firmly affixed directly to the meter mounting apparatus by the screw 78 and the fasteners associating with the bracket holes 84. Of course, as the dimensions of the housing which will be employed are known, the length of the bracket 80 is predetermined to cooperate with the desired housing, wherein the bracket 80 and channel member 10 will be completely located within the housing and will not be exteriorly visible.

In the embodiment of FIG. 7 a similar installation is illustrated wherein modifications are present which permit the use of bypass fittings with the meter, which enables the meter to be circumvented when changing meters, without interrupting the gas service to the consumer.

In FIG. 7 components similar to those as previously described are indicated by primes. The conduits 20' and 22' are formed with 90° bends at the upper regions 30' and bypass fittings 88 are screwed to the upper ends of the conduits. A gas meter 90 directly attaches to the bypass fittings 88, and a housing will usually be employed to enclose the meter and mounting installation as shown in FIG. 6, but not illustrated. A gas pressure regulator 92 is shown in FIG. 7 connected to the lower end of conduit 20′, and an elbow fitting 94 is illustrated as being attached to the lower end of the outlet conduit 22′ which permits the outlet conduit to pass through the side of the building to which the mounting apparatus is installed. Of course, it will be appreciated that the installation shown in FIG. 6 may also include a pressure regulator, and the elbow 94 may be employed in lieu of the pipe 70.

Quantity gas service installations by a public utility company usually employ identical meters and installation techniques. As the meter mounting apparatus in accord with the invention is constructed upon accurately formed fixtures and jigs, the spacing between the upper ends 32 of the conduits 20 and 22 is accurately regulated, as well as the locations of the lower ends of the conduits. Thus, as no adjustments are required at the point of installation, except the height of the channel member 10, the opportunity of undesirable stresses being placed upon the meter mounting apparatus conduits and the supply outlet conduits is minimized, which is important from a safety aspect. The number of "loose" components is minimized with this type of meter mounting apparatus, and this type of installation is preferred by utility companies in that it simplifies the preparing for and actual assembly of the meter installation procedure.

It is appreciated that various modifications to the inventive concept may be apparent to those skilled in the art without departing from the spirit and scope thereof.

I claim:

1. Meter mounting apparatus comprising, in combination, an elongated channel member including a base portion and side portions disposed on opposite longitudinal edges of said base portion depending in a common direction from said base base portion, an outer surface defined on said side portions, said channel member adapted to be mounted in a vertical manner and including an upper end and a lower end, a conduit welded to each side portion outer surface of said channel member, each of said conduits including a central region, an upper region and lower region, said central regions of said conduits being disposed adjacent the associated channel member side portion outer surface and welded thereto, said upper regions of said conduits extending in a direction transverse to the length of said channel member and the associated central region, meter fitting attachment means defined upon the terminating ends of said upper regions, and attachment means defined on said channel member.

2. Meter mounting apparatus as in claim 1 wherein said channel member side portions and outer surfaces are parallel to each other.

3. Meter mounting apparatus as in claim 1 wherein said central and upper regions of each conduit define a plane, said conduits being welded to said channel members such that said planes of said conduits as defined by said central and upper regions thereof are angularly disposed with respect to each other and said upper regions extend away from each other.

4. Meter mounting apparatus as in claim 1 wherein the lower region of said conduits is offset with respect to the central region of the common conduit in a direction from the associated central region generally corresponding to the transverse extension of the upper region of the associated conduit.

5. Meter mounting apparatus as in claim 1 wherein a meter housing mounting flange is defined on said channel member upper end, a meter housing support bracket affixed to said channel member spaced below said upper end and transversely related to said channel member having end portions outwardly disposed with respect to each of said channel member side portions, and meter housing mounting means defined on each of said bracket end portions.

6. Meter mounting apparatus as in claim 5 wherein said meter housing mounting flange is defined from said channel member base portion and is deformed from said base portion in the direction of said side portions.

References Cited

UNITED STATES PATENTS

| Re. 26,191 | 4/1967 | McDowell | 248—68 |
|---|---|---|---|
| 1,801,993 | 4/1931 | Beckwith | 248—68 |
| 2,535,427 | 12/1950 | Kindorf | 248—68 |
| 3,208,704 | 9/1965 | McDowell | 248—68 |

CHANCELLOR E. HARRIS, Primary Examiner

U.S. Cl. X.R.

73—201; 138—106